United States Patent [19]

Lohr, Jr.

[11] 4,017,458

[45] Apr. 12, 1977

[54] STABILIZATION OF POLY(PHOSPHAZENES)

[75] Inventor: Delmar Frederick Lohr, Jr., Akron, Ohio

[73] Assignee: The Firestone Tire & Rubber Company, Akron, Ohio

[22] Filed: Feb. 26, 1976

[21] Appl. No.: 661,688

[52] U.S. Cl. .................... 260/45.75 W; 260/37 N; 260/42.27

[51] Int. Cl.$^2$ .......................................... C08K 5/47

[58] Field of Search ....... 260/37 N, 45.75 W, 47 P, 260/2 P, 42.27

[56] References Cited

UNITED STATES PATENTS

| | | | |
|---|---|---|---|
| 3,004,949 | 10/1961 | Chevassus | 260/45.75 W |
| 3,271,330 | 9/1966 | Evans | 260/2 P |
| 3,370,020 | 2/1968 | Allcock et al. | 260/2 P |
| 3,515,688 | 6/1970 | Rose | 260/2 P |
| 3,700,629 | 10/1972 | Reynard et al. | 260/47 P |
| 3,702,833 | 11/1972 | Rose et al. | 260/2 P |
| 3,843,596 | 10/1974 | Kyker et al. | 260/45.75 B |
| 3,853,794 | 12/1974 | Reynard et al. | 260/47 R |
| 3,867,341 | 2/1975 | Kyker | 260/45.75 W |
| 3,945,966 | 3/1976 | Vicic et al. | 260/42.29 |
| 3,970,533 | 7/1976 | Kyker | 260/2 P |

OTHER PUBLICATIONS

Polymer Engineering and Science, May, 1975, vol. 15, No. 5, pp. 321 to 338.
J. Polymer Science, Symposium, No. 48, 33–45 (1974), Publishers: John Wiley & Sons Inc.

*Primary Examiner*—V. P. Hoke

[57] ABSTRACT

Stabilization of poly(phosphazenes) against thermal degradation is achieved by the incorporation of suitable amounts of zinc 2-mercaptobenzothiazole in such polymers especially in compositions comprising such polymers and fillers for the same.

8 Claims, No Drawings

STABILIZATION OF POLY(PHOSPHAZENES)

This invention relates to the stabilization of poly(phosphazenes) against thermal degradation. Prior art efforts to stabilize poly)phosphazenes) against thermal degradation are described in two recently issued U.S. Pat. Nos. 3,843,596 issued Oct. 22, 1974 and 3,867,341 issued Feb. 18, 1975; wherein the use of various inorganic and metallo-organic compounds for this purpose is described.

The present invention is directed to the use of a stabilizer which is readily available commercially and which is effective for the same purposes as the prior art stabilizers.

The poly(phosphazenes) to which the present invention is applicable include those described in the following United States Patents, the disclosures of which are intended to be incorporated by this reference:

Evans U.S. Pat. No. 3,271,330 issued Sept. 6, 1966
Allcock et al U.S. Pat. No. 3,370,020 issued Feb. 20, 1968
Rose U.S. Pat. No. 3,515,688 issued June 2, 1970
Reynard et al U.S. Pat. No. 3,700,629 issued Oct. 24, 1972
Rose et al U.S. Pat. No. 3,702,833 issued Nov. 14, 1972
Reynard et al U.S. Pat. No. 3,853,794 issued Dec. 10, 1974
Reynard et al U.S. Pat. No. 3,856,712 issued Dec. 24, 1974
Rose et al U.S. Pat. No. 3,856,713 issued Dec. 24, 1974
Reynard et al U.S. Pat. No. 3,883,451 issued May 13, 1974
and others of a similar nature.

In general, these may be described as substantially linear polymers in which a chain or backbone consists of alternating N and P atoms to which are attached substituents including alkoxy, fluoroalkoxy, aryloxy, amino, arylalkoxy and other such groups which may be further substituted so that these poly(phosphazenes) may be represented by the generic formula:

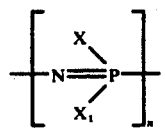

wherein $n$ is an integer greater than 3 and up to 50,000 or more, and each X represents a group attached to a P atom and any number of different groups may be present from 1 to as many as are provided in order to impart desired properties to the poly(phosphazenes).

For purposes of illustration, the present invention will be described for poly(phosphazenes) in which the substituent groups present are represented by a mixture of $CF_3CH_2O$ and $HCF_2(CF_2)_xCH_2O$ in which X is 1, 3, 5, and 7, and there are also present small amounts of o-allylphenoxy groups to provide cure sites as described in copending United States Patent Application Ser. No. 544,976 filed Jan. 29, 1975 now U.S. Pat. No. 3,972,841 of which I am aware.

A principal object of this invention is to improve the retention of physical properties of poly(phosphazene) vulcanizates after exposure to elevated temperatures.

A further object of the invention is to use a readily available chemical as a stabilizer for poly(phosphazenes).

Still another object is to use zinc 2-benzothiazylthioate as a stabilizer for alkoxy substituted poly(phosphazenes), particularly fluoroalkoxy substituted polymer.

The following example is intended to illustrate a preferred embodiment of my invention, and is not intended to limit the same in any way.

One hundred parts by weight of the polymer, a poly(phosphazene) in which the substituents on the P atoms were principally fluoroalkoxy groups represented by the formulas $CF_3CH_2O$ and $HCF_2(CF_2)_xCH_2O$ in which X was 1, 3, 5, and 7, and which also contained a small number (up to 1%) of o-allyl phenoxy groups was mixed in a Braebender mixer with 30 parts of silica, 6 parts of magnesia, and various amounts of stabilizer for about 15 minutes. The resulting Masterbatch was cooled to about room temperature (22° C) was then charged to a 55° C mill (rolls heated to 55° C) and then 0.35 parts by weight of dicumyl peroxide was added. After thorough mixing, the batch was molded into test slabs which were cured at 171° C for 25 minutes. Some of the slabs were then aged at 175° C for varying lengths of time. The properties of the unaged (0 hours) and the aged slabs for various levels of zinc 2-benzothiazylthioate (2-mercaptobenzothiazole) were as follows:

| Stabilizer parts/100 parts polymer | 0 | 0.5 | 1.0 | 1.5 | 2.0 |
|---|---|---|---|---|---|
| Modulus 100% Elongation (MPa) | | | | | |
| 0 hours at 175° C | 8.1 | 6.4 | 7.1 | 7.9 | 6.6 |
| 120 hours at 175° C | 3.2 | 3.0 | 3.8 | 4.2 | 4.7 |
| 240 hours at 175° C | 2.2 | 1.9 | 2.4 | 2.6 | 2.6 |
| % retained after 240 hours | 27 | 30 | 34 | 33 | 39 |
| Tensile Strength (MPa) | | | | | |
| 0 hours at 175° C | 9.3 | 9.3 | 9.4 | 9.5 | 8.4 |
| 120 hours at 175° C | 5.4 | 5.8 | 7.0 | 7.6 | 8.2 |
| 240 hours at 175° C | 4.7 | 5.0 | 5.9 | 6.0 | 6.1 |
| % retained after 240 hours | 51 | 64 | 63 | 63 | 73 |

A similar formulation was processed in the same way, except that the amount of dicumyl peroxide was increased from 0.35 parts to 1 part (40% active peroxide) per 100 parts by weight of poly(phosphazene).

With four different batches of poly(phosphazenes) the results were as follows:

| | I | II | III | IV |
|---|---|---|---|---|
| Stabilizer (parts/100 parts polymer) | | | | |

-continued

| | I | | II | | III | | IV | |
|---|---|---|---|---|---|---|---|---|
| | 0 | 1 | 0 | 1 | 0 | 1 | 0 | 1 |
| Modulus 100% Elongation (MPa) | | | | | | | | |
| 0 hours at 175° C | — | 6.7 | — | 5.7 | 6.5 | 7.4 | 9.6 | 7.4 |
| 120 hours at 175° C | 6.4 | 6.6 | 3.4 | 6.1 | 4.5 | 5.8 | 6.3 | 7.0 |
| 240 hours at 175° C | 4.8 | 5.4 | — | 4.7 | 2.6 | 4.8 | 3.8 | 6.1 |
| % Retained after 240 hours | — | 81 | — | 82 | 40 | 65 | 40 | 81 |
| Tensile Strength (MPa) | | | | | | | | |
| 0 hours at 175° C | 9.8 | 10.0 | 8.8 | 8.1 | 10.9 | 10.3 | 11.2 | 11.4 |
| 120 hours at 175° C | 7.4 | 8.7 | 4.8 | 7.2 | 7.8 | 9.8 | 9.4 | 10.4 |
| 240 hours at 175° C | 5.5 | 7.4 | 3.7 | 5.0 | 4.1 | 7.7 | 6.4 | 8.1 |
| % Retained after 240 hours | 56 | 74 | 42 | 62 | 38 | 75 | 57 | 71 |

An effective level of stabilizer is between 0.05 and 5.0 parts by weight per 100 parts by weight of poly(phosphazene). A preferred range is between 1.0 and 2.0 parts by weight, particularly for fluoro-alkoxy substituted poly(phosphazene).

Other fillers and other compounding ingredients can be present in the formulation which are to be vulcanized, including for example, those described in U.S. Pat. No. 3,867,341 issued Feb. 18, 1975.

Having now described the invention in accordance with the Patent Statutes, it is not intended that it be limited except as may be required by the appended claims.

I claim:

1. A poly(phosphazene) composition stabilized against thermal aging comprising a poly(phosphazene) represented by the general formula:

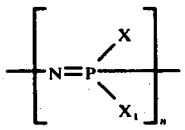

wherein $n$ represents an integer from 3 up to about 50,000 and X and $X_1$ each represent a monovalent substituent selected from the groups consisting of alkoxy, substituted alkoxy, aryloxy, substituted aryloxy, hydroxy and amino, and X and $X_1$ are randomly distributed along the $-P=N-$ backbone and the poly(phosphazene) includes one or two or more randomly distributed groups and an organometallic compound compatible with said poly(phosphazene) and present in an amount sufficient to stabilize said poly(phosphazene) against thermal degradation, said organometallic compound being zinc 2-mercaptobenzothiazole.

2. Poly(phosphazenes) according to claim 1 wherein the stabilizer is present in an amount between 0.05 and 5.0% by weight.

3. The stabilized poly(phosphazenes) of claim 1 wherein X and $X_1$ are fluoroalkoxy or fluoroaryloxy groups.

4. Elastomers consisting essentially of the stabilized poly(phosphazenes) of claim 1.

5. Plastics consisting essentially of the stabilized poly(phosphazenes) of claim 1.

6. Thermoplastic elastomers consisting essentially of the stabilized poly(phosphazenes) of claim 1.

7. Fibers consisting essentially of the stabilized poly(phosphazenes) of claim 1.

8. Vulcanized articles consisting essentially of the stabilized poly(phosphazenes) of claim 1.

* * * * *